United States Patent [19]

Gottwald et al.

[11] Patent Number: 4,610,272

[45] Date of Patent: Sep. 9, 1986

[54] ACTUATING DEVICE FOR A MIXING VALVE

[75] Inventors: Adolf Gottwald, Iserlohn; Wilfried Köster, Menden, both of Fed. Rep. of Germany

[73] Assignee: Friedrich Grohe Armaturenfabrik GmbH & Co., Hemer, Fed. Rep. of Germany

[21] Appl. No.: 662,215

[22] Filed: Oct. 18, 1984

[30] Foreign Application Priority Data

Oct. 19, 1983 [DE] Fed. Rep. of Germany ....... 3337968

[51] Int. Cl.$^4$ ............................................... E03C 1/01
[52] U.S. Cl. ............................ 137/625.17; 137/636.3; 251/285; 251/288
[58] Field of Search ......................... 137/625.17, 636.3; 251/285, 288

[56] References Cited

U.S. PATENT DOCUMENTS

| | | | |
|---|---|---|---|
| 2,635,622 | 4/1953 | Owens | 251/285 |
| 2,864,398 | 12/1958 | Green | 137/625.17 |
| 3,168,112 | 2/1965 | Klingler | 137/625.17 |
| 3,410,487 | 11/1968 | Hyde | 137/625.17 |
| 3,964,514 | 6/1976 | Manoogian et al. | 251/285 |
| 4,200,596 | 4/1980 | Iiyama et al. | 251/285 |
| 4,325,403 | 4/1982 | Uhlmann | 137/625.17 |
| 4,375,225 | 3/1983 | Andersson | 137/625.17 |
| 4,387,880 | 6/1983 | Saarisalo et al. | 251/285 |

FOREIGN PATENT DOCUMENTS

| | | |
|---|---|---|
| 7232994 | 9/1972 | Fed. Rep. of Germany . |
| 1963451 | 12/1977 | Fed. Rep. of Germany . |
| 3018771 | 5/1980 | Fed. Rep. of Germany . |
| 2856300 | 10/1980 | Fed. Rep. of Germany . |
| 3018180 | 11/1981 | Fed. Rep. of Germany . |
| 3103891 | 9/1982 | Fed. Rep. of Germany . |

Primary Examiner—Martin P. Schwadron
Assistant Examiner—Sheri M. Novack
Attorney, Agent, or Firm—Karl F. Ross; Herbert Dubno

[57] ABSTRACT

An actuating device for a mixing valve having a valve housing and a movable valve member includes a hand lever which is partly accommodated within a housing and operatively connected to the valve member. The hand lever is movable about two axes perpendicular to each other and is provided with an arc which projects through a slot into the interior of the housing. In order to minimize the size of the slot and to obtain an attractive visual appearance, the arc is provided with an inner contour aligned with the respective housing portion and having a radius extending from a fixed point of one of the axes.

10 Claims, 7 Drawing Figures

ACTUATING DEVICE FOR A MIXING VALVE

FIELD OF THE INVENTION

Our present invention relates to an actuating device for a mixing valve to control the flow volume as well as the mixing ratio of hot and cold water and, more particularly to an improved, single-handle mixing and control valve, e.g. for domestic water service.

BACKGROUND OF THE INVENTION

The German Patent DE-PS No. 30 18 771 describes a mixing valve employing a sphere movably supported in a hemispherical socket which has the supply lines for hot and cold water and the discharge line for the mixture. The sphere is supported in the socket in such a manner that a movement about two axes perpendicular to each other is permitted in order to control the flow volume and the mixing ratio. Connected to the sphere is a hand lever which extends radially outwardly through a slot within the outer jacket of the valve housing to allow actuation of the sphere by an operator.

Apart from the fact that the visual appearance of such a mixing valve is not attractive, because the slot is exposed towards the outside, the prior art has the further drawback that the slot covers a substantial part of the length of the jacket because the hand lever also is required to be moved in horizontal direction along a substantial way in order to provide the control of the sphere.

It is also known to provide mixing valves with valve disks encased within a valve housing portion and with a hand lever which projects into the housing. The hand lever is fixedly connected to a lid which surrounds a correspondingly provided top portion of the valve housing. Due to the fixed connection between the lid and the hand lever, the swinging and gyratory or undulating motions of the hand lever are necessarily transmitted to the lid. This however, is undesirable as the visual appearance of the mixing valve is impaired. Excessively exposed slot lengths also lead to contamination of the interior of the valve with concomitant danger of interference with operation and sanitary problems.

OBJECT OF THE INVENTION

It is thus the object of our invention to provide a mixing valve with an improved actuating device obviating the aforestated drawbacks.

SUMMARY OF THE INVENTION

We realize this object, according to the present invention, by providing an actuating device including a hand lever partly accommodated within a respective housing and operatively connected with the valve member of the mixing valve so as to move the valve member about two axes perpendicular to each other whereby the hand lever is provided with a bend in the form of a circular arc segment which projects through the housing and has an inner radius extending from a fixed point located on one of the axes, i.e. a center of curvature preferably on the axis which is transverse to the plane of the hand lever.

More specifically the valve member can be displaceable about an axis with which the lever handle is substantially coplanar (first axis) to select the proportions of hot and cold water to be mixed, and about a second axis transverse to the first axis and hence to this plane.

The center of curvature of the bend, which advantageously extends downwardly and outwardly from the portion of the lever connected to the valve member within the housing, can lie at the intersection of these two axes, the bend passing through a slot in a movable housing portion which can be rotated from side to side as the lever is displaced about the first axis.

Through the provision of such a circular arc bend as part of the handle, the slot in the housing provided to allow penetration of the arc into the interior thereof is considerably reduced and is invisible from the outside as the arc or bend completely fills this slot. Therefore, the housing appears to be of a closed design regardless of the position of the hand lever and provides the mixing valve with an attractive appearance and further allows easy maintenance due to the closed design. Contamination is likewise minimized.

The hand lever has a grip which extends outwardly from the outer end of the bend at an angle to this outer end which should not exceed 120° and maybe less than 90°. This grip can easily be actuated by an operator. It is, however, also possible to connect the grip to the bend via a bracket which extends around the housing so that the bend is located at a position of the housing remote to the operator while the grip is arranged essentially opposite the bend and directed to the operator.

According to our invention, the movement of the hand lever about the axes can be limited so as to be able to control the flow volume and the mixing ratio of the mixing valve. Accordingly, the actuating device includes a plug ring which is fixed to the valve housing in a detachable manner and supports at least one stop against which the hand lever can abut. Consequently, the movement of the hand lever to control the mixing ratio is limited depending on the position of the stop i.e. in what position the plug ring is fixed to the valve housing. To obtain a detachable connection, the valve housing is provided with a serration against which the plug ring engages.

For controlling the flow volume, the bend is provided with an extension accommodating a through-passage in which an adjusting screw is located. By simply adjusting the screw in the passage, the movement of the hand lever between its end positions is controllable, i.e. depending on the position of the screw, the hand lever can selectively open the mixing valve to control the flow volume.

Access to the part of the hand lever arranged within the housing is easily available by simply removing a lid which is connected to the housing via any suitable disengageable means like screw connection, snap connection or bayonet connection. In order to enhance the visual appearance, the lid can be provided with a decorative sheet of any design.

BRIEF DESCRIPTION OF THE DRAWING

The above and other features of our present invention will now be described in detail with reference to the accompanying drawing in which.

SPECIFIC DESCRIPTION

Figure 1:
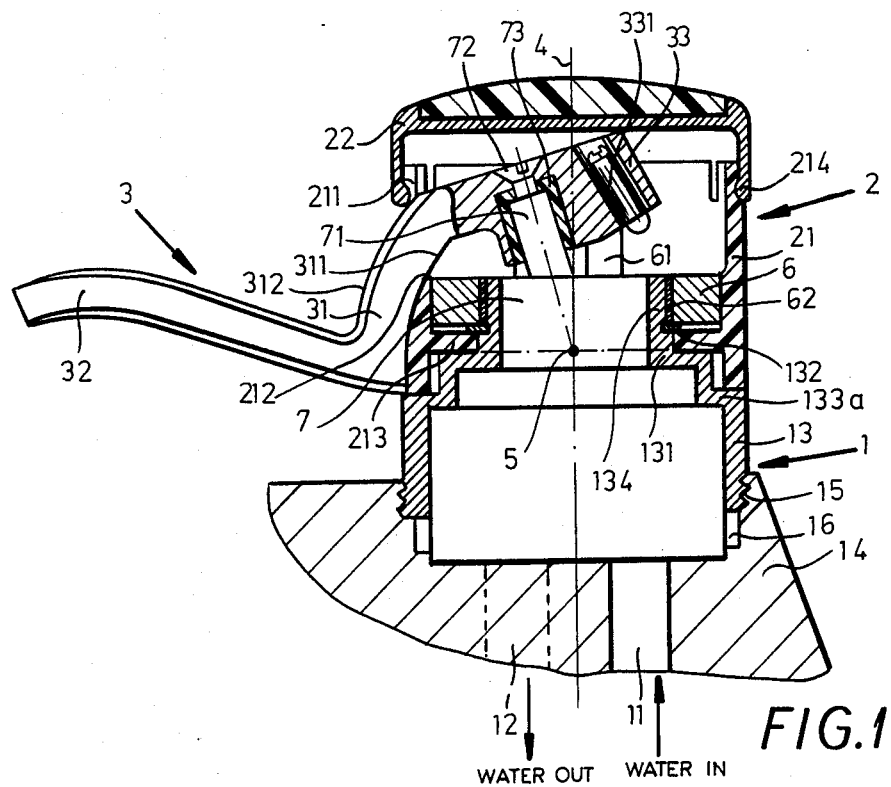
FIG. 1 is sectional view of a mixing valve provided with an actuating device according to the invention.
Figure 2:
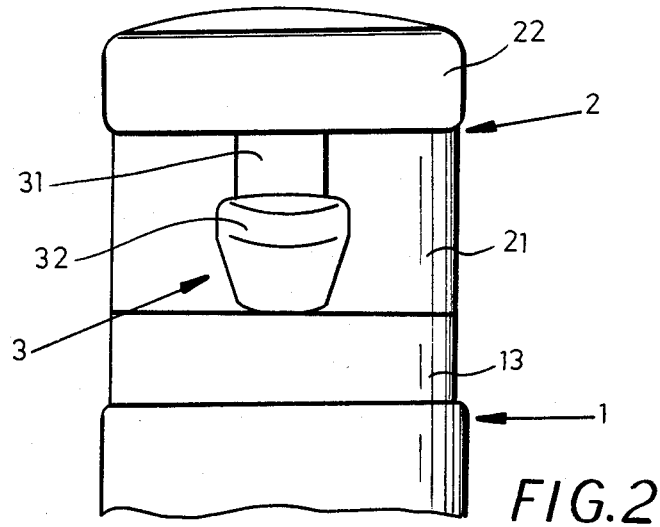
FIG. 2 is a side view of the mixing valve of FIG. 1.

In FIG. 1, there is shown a mixing valve body or valve housing 1 which includes a socket or base 14 which at its upper extremity is provided with a recess 16 receiving a sleeve 13. The sleeve 13 is screwed to the base 14 via a thread connection 15 and embraces a valve cartridge 7 which is formed by two superposed disks made e.g. of oxide ceramics material. Since the structure of valve cartridges is known, a detailed description and illustration of the disks is omitted. This cartridge can be a Eurodisk valve cartridge as manufactured by Friedrich Grohe Armaturenfabrik GmbH & Co, see also copending application Ser. No. 556,152 filed Nov. 29, 1983. In general one of the disks is stationarily located in the cartridge while the other disk is movable and provided with a cartridge lever at the end face of the cartridge remote to the socket 14. The lever which is illustrated in FIG. 1 and characterized by numeral 71 is movable about two rotational axes. When being rotated about axis 4, the lever 71 and the connected control disk is moved relative to the stationary disk so as to cause a modification of the mixing ratio of cold and hot water while by swivelling about the axis 5, the control disk is radially displaced with respect to the stationary disk so that the flow volume is changed.

The socket 14 accommodates channels 11 through which the cold and hot water are respectively supplied to the cartridge 7 and a channel 12 for discharging the so-obtained mixing water to e.g. an associated sink.

As shown in FIG. 1, the sleeve 13 is step-shaped so as to be provided with an upper shoulder 131 and a lower shoulder 133a. Resting on the upper shoulder 131 is a flange portion 213 of a jacket 21 which forms a part of a top housing portion 2. The jacket 21 is cylindrically shaped and has a lower extension abutting on the lower shoulder 133a. The flange 213 extends radially inwardly from the jacket and is arranged on the shoulder 131 such that a rotation about axis 4 is possible while an axial displacement is prevented by a snap ring 132.

Between the jacket 21 and the upper portion 134 of the sleeve 13 is a space in which a plug ring 6 is located and cooperating with a serration 62 provided at the circumference of the upper portion 134 of the sleeve 13 so that the ring 6 can be fixed in its position. Formed on the ring 6 are a pair of stop cams 61 which oppose each other and are provided to limit pivoting about the axis 5 and thus the fraction of hot water in the mixing ratio as will be described hereinbelow.

For pivoting the cartridge lever 71 about its freedom axes, a hand lever is provided which is generally indicated by numeral 3. The hand lever 3 includes a grip portion 32 radially extending at an obtuse angle in direction of an operator and a circular arc-segment bend 31, which may be referred to simply as the arc, whose one end angularly adjoins the grip 32. The arc or bend 31 projects through a slot 211 arranged in the jacket 21 into the interior of the top portion 2 and is provided with an extension 33 at its other end. At a location adjacent the arc 31, the extension has a stepped through-hole 73 whose lower part is dimensioned such that it fits tightly on the lever 71 of the cartridge 7. By means of a countersunk screw 72, the bend 31 and thus the hand lever 3 is securely fixed in a form-locking manner onto the cartridge lever 71.

Adjacent the through-hole 73, the extension 33 is provided with a through-passage 74 in which an adjusting screw 331 is arranged. The screw 331 is movable within the passage 74 so that its end portion can project beyond the extension 71 to limit pivoting about the axis 5. As counterstop for the adjusting screw 331, the plug ring 6 or the valve housing 1 can be used.

Once the hand lever 3 is connected to the mixing valve, a lid 22 is fixed to the jacket 21 via a snap connection 214 so that assembling of the mixing valve and access to the interior thereof is provided in an easy manner.

As already mentioned, the jacket 21 is provided with an elongated slot 211 so as to allow the hand lever 3 to project into the interior of the top housing portion 2 and to be connected to the lever 71. The arc 31 which projects through the slot 211 into the interior of the top portion 2 defines an inner contour 311 which is aligned with the outer contour of the jacket 21. Consequently, the inner contour 311 has a radius r measured from the axis 5 constituting the center of the arc 31 which radius is about half the outer diameter of the jacket 21. The slot 211 extends from the upper end face of the jacket 21 so as to be accessible from outside when the lid 22 is removed and the hand lever 3, i.e. its arc portion 31 is to be inserted therein. The other end 212 of the slot 211 is defined by the radius r of the arc 31 so that once the lid 22 is fixed to the jacket 21, the slot 211 is completely filled by the arc 31. In order to prevent a penetration of water through the slot 211, the lid 22 extends with its snap portion 214 adjacent the outer contour 312 of the arc 31 and is aligned therewith.

Figure 3:
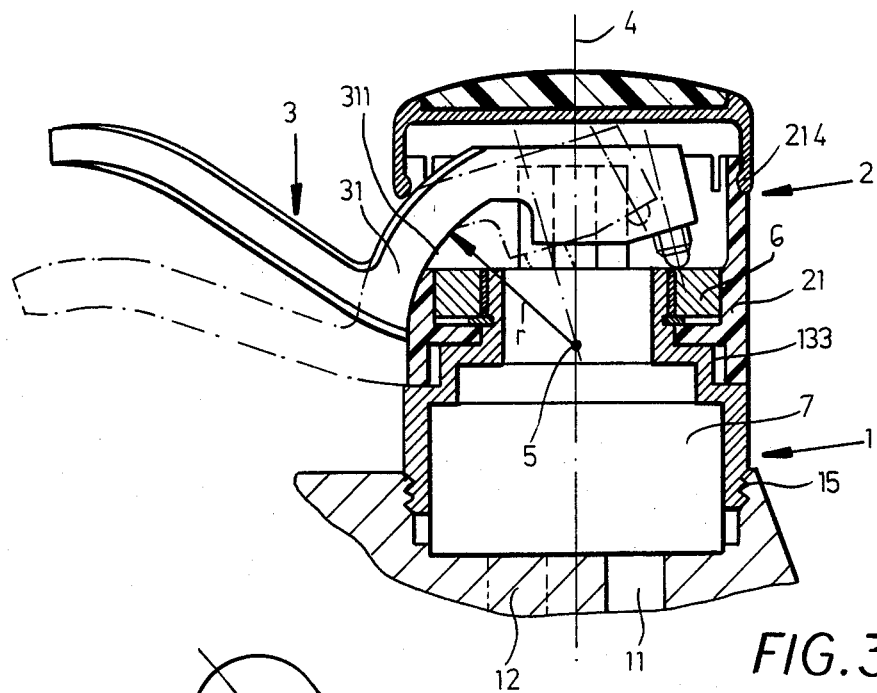
FIG. 3 illustrates the mixing valve according to FIG. 1 and having a hand lever shown in its end positions.
Figure 4:
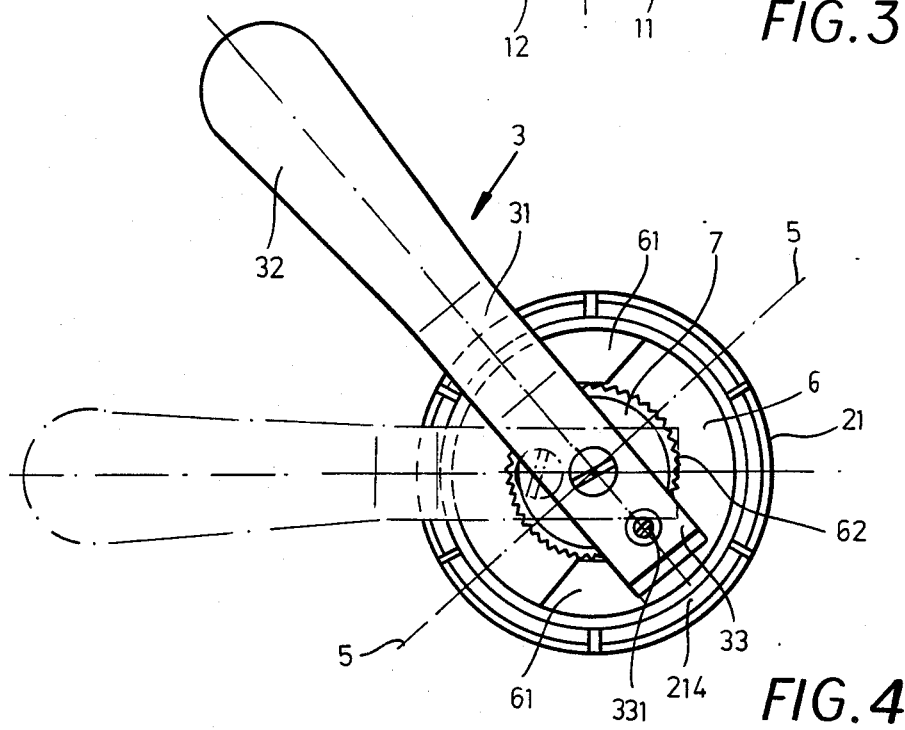
FIG. 4 is a top view of the mixing valve according to FIG. 3.

Thus, when the hand lever 3 is pivoted about the rotation axis 5 by proper actuation of the grip 32 (FIG. 3), the arc 31 is moved through the slot 211 with its inner contour sliding along the jacket 21 and its outer contour 312 passing by the snap portion 214 of the lid 22. Pivoting the grip 32 about the rotation axis 4 will cause the jacket 21 and the lid 22 to be moved correspondingly with respect to the valve housing 1. Thus, the interior of the top portion 2 of the housing will be protected against spray water regardless of the actuation of the hand lever 3.

Assembling of the handle to the valve cartridge 7 can be executed for example in the following manner:

After positioning the valve cartridge 7 in the recess 16 of the socket 14, the sleeve 13 is threaded into the socket 14 by means of a wrench which is engaged on the faces 133. Thus, the cartridge 7 is fixed tightly and against any rotation within the valve housing 1. Thereafter, the jacket 21 is positioned on the sleeve 13 by abutting the flange 213 on the shoulder 131 and secured against axial movement by the snap ring 132. The plug ring 6 is then arranged on the serration 62 in any desired manner so as to accordingly limit the pivoting of the hand lever 3 about the axis 4. After positioning of the plug ring 6, the hand lever 3 can be inserted through the slot 211 which is open at its upper extension towards the outside, and then mounted on the cartridge lever 71. Through tightening of the screw 72, the hand lever 3 is securely fixed on the lever 71 and then the lid 22 is fixed to the jacket via the snap connection 214.

In case, during the operation of the mixing valve, it is desired to limit the maximum flow volume, the lid 22 can simply be removed and the thus accessible adjusting screw 331 can be screwed into the passage 74 so that its end portion projects further beyond the extension 33, thus reducing the pivoting of the handle about the axis 5.

In order to modify the adjustable mixing ratio, e.g. when a protection against scalding is desired, the lid 22 and the hand lever 3 are removed in order to provide access to the plug ring 6 which is lifted from the serration and reengaged in a different position so that the stop cams 61 occupy a position which further limits the pivoting about the axis 4. For facilitating the adjustment of the mixing range, it is preferred to provide markings at the surface of the shoulder 131 and the plug ring 6.

Figure 5:
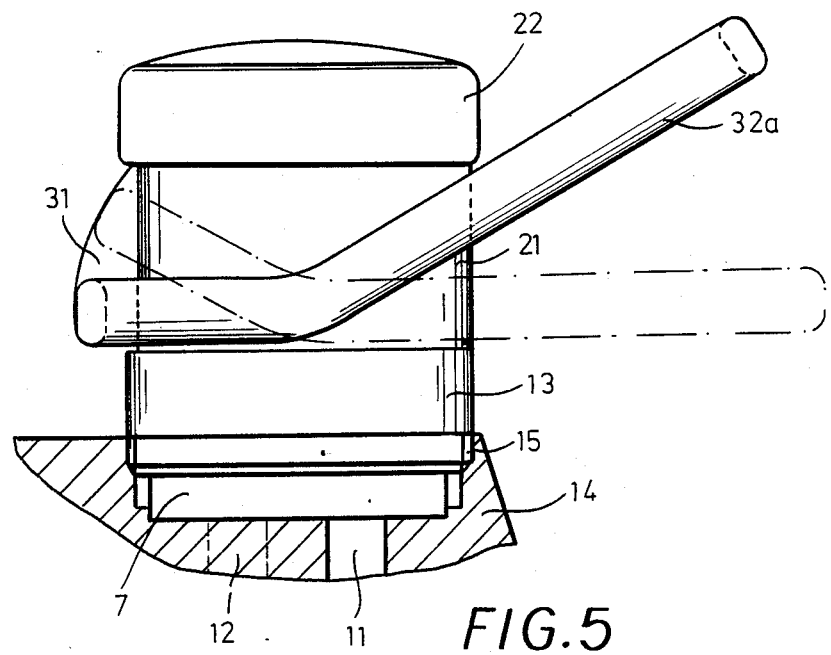
FIG. 5 is a sectional view of the mixing valve provided with a further embodiment of an actuating device according to the invention.
Figure 6:
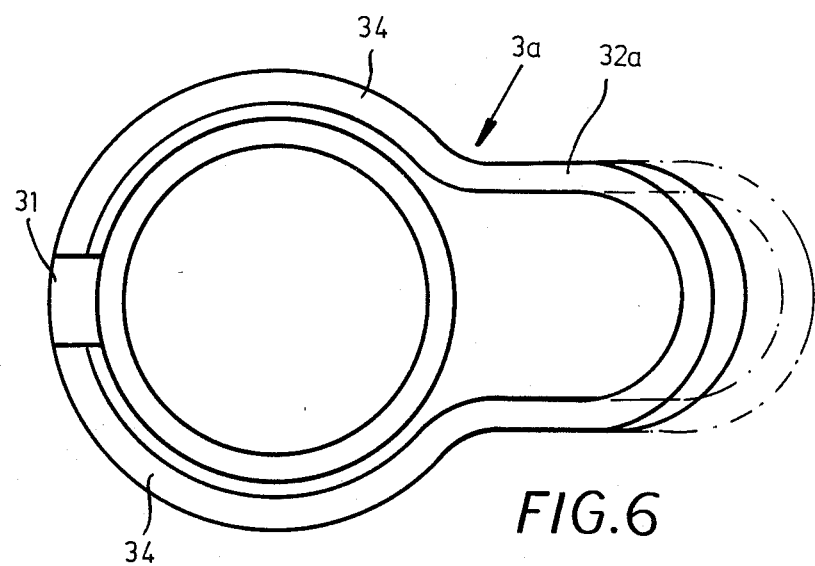
FIG. 6 is a top view of the mixing valve of FIG. 5.

Turning now to the embodiment as shown in FIGS. 5 and 6 it may be seen that the only difference to the embodiment of FIGS. 1 to 4 resides in the structure of the hand lever. Accordingly, a hand lever 3a is provided whose bend 31 is arranged at the side of the jacket 21 remote to the operator that is at the rear portion of the mixing valve. The bend 31 has an outer extremity located outside the valve housing 1 which extremity is connected to a bracket 34. The bracket 34 extends around the jacket 21 and leads to a grip 32a at the side of the mixing valve facing the operator. The grip 32a extends at an obtuse angle with respect to the bracket 34 so as to allow easy actuation of the hand lever 3a.

Figure 7:
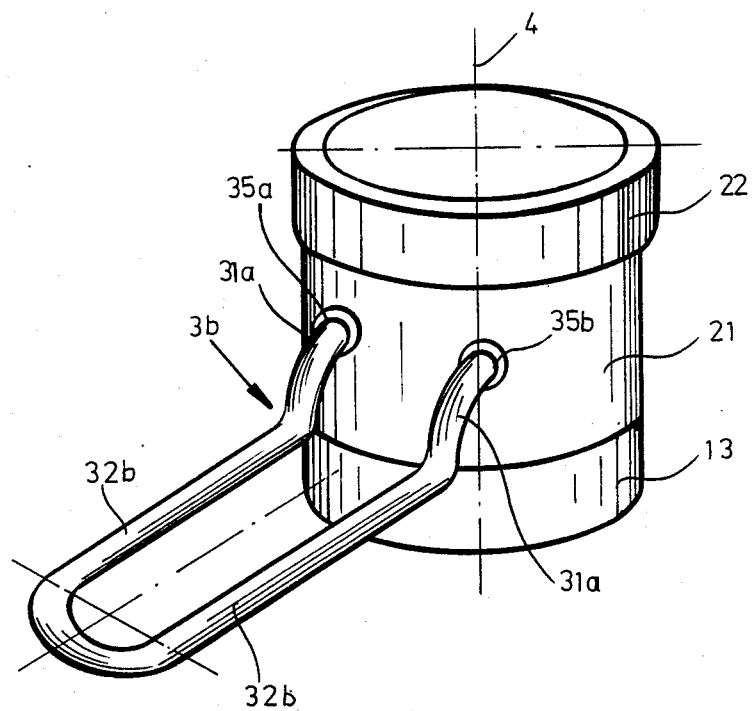
FIG. 7 is a top view of a still further embodiment of an actuating device according to the invention.

In the embodiment shown in FIG. 7, a hand lever 3b is used which is formed as a U-bend of round rod material. The lever has two shanks 34a, 34b each of which being provided with an arcuate bend 31a at an end remote from the bight connecting these shanks. The shanks 34a, 34b run through respective openings 35a, 35b within the jacket 21. Within the housing, the bends 31a can be joined by a yoke (not shown) which connects them to the actuating member 71.

We claim:

1. An actuating device for a control and mixing valve, comprising:
   a valve body provided with a rotatable valve housing;
   a valve mechanism in said housing and said body and including a movable valve member pivotal about a first axis and a second axis perpendicular to said first axis, said movable member being enclosed by said valve housing, said valve housing being formed with a lateral opening; and
   a hand lever having;
   a grip,
   a portion lying within said housing,
   means connecting said portion to said member for pivoting said member about said first axis,
   and a bend between said portion and said grip corresponding to a circular arc centered on said second axis, extending through said opening and blocking said opening in all positions of said lever about said second axis, said valve housing being formed as a cap covering said portion and having a downwardly extending external wall surrounding said member and formed with said opening, said cap being rotatable on said body with said lever about said first axis.

2. A device as defined in claim 1 wherein said bend angularly adjoins said grip and said grip radially extends outwardly so as to project from said housing in direction to an operator.

3. A device as defined in claim 1 wherein said bend has a rear portion outside said housing, said lever further including a bracket extending from said rear portion of said arc around said housing, and a grip portion connected to said bracket at a location opposite to said rear portion of said bend.

4. A device as defined in claim 1 wherein said housing has an outer diameter, said bend having an inner radius corresponding to half of said outer diameter of said housing.

5. A device as defined in claim 1 wherein said housing includes a cylindrical jacket rotatably supported by the valve body, and forming said wall and said cap connectable to said jacket, said jacket having a slot forming said opening and elongated in the direction of said first axis and being defined by said cap at its upper extremity and by an arcuate portion shaped to conform to an inner radius of said bend at its lower extremity.

6. A device as defined in claim 5 wherein said jacket is provided with a flange portion extending radially inwardly and being supported by a shoulder o±the valve housing, said actuating device further including a snap ring for securing said flange port against displacement in direction of said first axis.

7. A device as defined in claim 5, further comprising limiting means for controlling movement of said lever about the said first axis, said limiting means including a plug ring, fixing means detachably connecting said plug ring to an upper portion of the valve housing, are at least one stop connected to said plug ring so that depending on the position of said plug ring relative to the upper portion of the valve housing said stop correspondingly limits the movement of said lever about said first axis.

8. A device as defined in claim 7 wherein said fixing means includes an array of teeth provided at the upper portion of the valve housing.

9. A device as defined in claim 1 wherein said bend is provided at its extremity projecting into said housing with an extension which accommodates a through-passage, said actuating device further including limiting means for controlling movement of said lever about said first axis and including an adjusting screw arranged within said through-passage, said screw being displaceable within said through-passage so as to control movement of said lever with respect to said first axis depending on the position of said screw in said through-passage.

10. A device as defined in claim 1 wherein said housing includes a cylindrical jacket rotatably supported by the valve housing and having two openings, said lever being formed as a U bend having a pair of shanks and a bight connecting said shanks, said shanks each having a respective such portion passing through a respective one of said openings.

* * * * *